(12) United States Patent  
Aldridge et al.

(10) Patent No.: US 7,080,449 B2
(45) Date of Patent: Jul. 25, 2006

(54) METHOD AND A CONNECTOR ARRANGEMENT FOR CONNECTING AND DISCONNECTING A GENERATOR TO A CIRCUIT WITH AN EXISTING ALTERNATING CURRENT

(75) Inventors: Wayne Kenneth Aldridge, Granby (GB); George McChesney Francis, Solihull (GB); Isobel Dorothy Rea, Loughborough (GB)

(73) Assignee: BG Intellectual Property Ltd., Reading (GB)

( * ) Notice: Subject to any disclaimer, the term of this patent is extended or adjusted under 35 U.S.C. 154(b) by 154 days.

(21) Appl. No.: 10/221,876

(22) PCT Filed: Feb. 27, 2001

(86) PCT No.: PCT/GB01/00840

§ 371 (c)(1),
(2), (4) Date: Dec. 20, 2002

(87) PCT Pub. No.: WO01/69078

PCT Pub. Date: Sep. 20, 2001

(65) Prior Publication Data

US 2003/0102847 A1    Jun. 5, 2003

(30) Foreign Application Priority Data

Mar. 15, 2000  (GB) .................... 0006114.3

(51) Int. Cl.
*H01R 43/00*  (2006.01)
*H05K 13/00*  (2006.01)
(52) U.S. Cl. .................... 29/854; 29/622; 290/70; 290/40 A; 307/64; 322/7; 322/8; 322/256; 322/258
(58) Field of Classification Search ............... 29/854, 29/622; 322/7, 8, 256, 258; 307/64; 290/70, 290/40 A
See application file for complete search history.

(56) References Cited

U.S. PATENT DOCUMENTS

| | | | |
|---|---|---|---|
| 3,808,451 A * | 4/1974 | Pittet ........................ 307/64 |
| 3,935,509 A * | 1/1976 | Eidinger ...................... 361/3 |
| 4,220,868 A * | 9/1980 | Takeuchi ...................... 290/7 |
| 4,642,547 A | 2/1987 | Redlich ........................ 322/3 |
| 4,841,216 A | 6/1989 | Okada et al. ................ 322/10 |
| 5,804,953 A * | 9/1998 | Bowyer et al. ............. 323/256 |
| 5,998,976 A | 12/1999 | Steffan ........................ 322/10 |

* cited by examiner

*Primary Examiner*—A. Dexter Tugbang
*Assistant Examiner*—Tim Phan
(74) *Attorney, Agent, or Firm*—Kennedy Covington Lobdell & Hickman, LLP

(57) ABSTRACT

A method and a connector arrangement for connecting and disconnecting an electrical generator, such as a prime mover driven alternator (10), to a circuit with an existing alternating current such as the mains electricity supply (20).

6 Claims, 4 Drawing Sheets

METHOD AND A CONNECTOR ARRANGEMENT FOR CONNECTING AND DISCONNECTING A GENERATOR TO A CIRCUIT WITH AN EXISTING ALTERNATING CURRENT

CROSS REFERENCE TO RELATED DOCUMENT

This application is a 371 of PCT/GB01/00840, filed on Feb. 27, 2001, which claims priority of United Kingdom Application No. 0006114.3, filed on Mar. 15, 2000.

FIELD OF THE INVENTION

The present invention relates to a method and a connector arrangement for connecting and disconnecting an electrical generator such as a prime mover driven alternator to a circuit with an existing alternating current such as the main electricity supply.

BACKGROUND OF THE INVENTION

A number of problems are encountered when connecting and disconnecting an electrical generator to a circuit carrying an existing alternating current such as the main electricity supply.

An electrical generator can be started in isolation until it reaches suitable power quality and the appropriate frequency and phase, and then connected to the main electricity supply. However, the provision of a control device to monitor the power quality of a generator and then connect the generator to the main electricity supply when the appropriate power quality has been achieved is expensive, increases the complexity of the device and is liable to error.

When disconnecting the electrical generator from the main electricity supply, arcing is produced between the contacts of the switch used for disconnection. This arcing wears out the contacts of the switch impairing performance and necessitating regular replacement which is inconvenient and expensive. Arcing also disturbs the quality of the main electricity signal which is prohibited. Arcing can also cause damage to other components and the starting of fires and its prevention by for example the provision of an inert gas atmosphere is expensive.

SUMMARY OF THE INVENTION

It is an object of the present invention to overcome one or more of the above problems.

According to a first aspect of the present invention a method of connecting a prime mover driven electrical alternator having two terminals to a circuit with an existing alternating current comprises connecting the two terminals of a prime mover driven alternator together through a suitably low impedance such that the prime mover arranged to drive the alternator does not move substantially and cannot make the alternator generate a current, initialising the prime mover arranged to drive the alternator so that it is in a suitable condition to drive the alternator at the frequency of the alternating current in the circuit to which it is to be connected and connecting the terminals of the alternator to a circuit with an existing alternating current to cause the alternator to start movement of the prime mover for the prime mover to drive the alternator to generate an alternating current with a suitable power quality for the circuit thereafter.

A Stirling engine is preferably used as the prime mover as it can be initialised by being heated by an external heat source and then remain in a state ready to be brought into operation extremely quickly. Starting the Stirling engine only requires a small amount of energy since the pistons, which are the moving part, are relatively light and can be accelerated from rest very easily. The acceleration of the pistons from rest is continued in the normal operation of the engine, by linear simple harmonic motion.

The starting energy is provided by applying the alternating current from the circuit to which the prime mover driven alternator is to be connected, which is usually main power, to the stator of the alternator through a suitable impedance to limit the inrush current and to bring the alternator closely into phase with the main.

According to a second aspect of the present invention a method of disconnecting a prime mover driven electrical alternator from a circuit with an existing alternating current comprises connecting an impedance in parallel with the prime mover driven electrical alternator, the impedance having a sufficiently low impedance to require a current in excess of that which the alternator is able to deliver to prevent the prime mover from driving the alternator and thus stalling the alternator and disconnecting the alternator from the circuit with an existing alternating current.

By stalling the alternator before disconnecting it from the main, the arcing caused when it is disconnected is substantially reduced.

According to a third aspect of the present invention an apparatus for connecting a prime mover driven alternator to a circuit with an existing alternating current comprises an impedance switchable into and out of a parallel arrangement with the alternator, the impedance being of sufficiently low value that the prime mover cannot drive the alternator to produce a current around the parallel impedance and a switch to connect the prime mover driven alternator to the circuit with an existing alternating current.

According to a fourth aspect of the present invention an apparatus for disconnecting a prime mover driven alternator from a circuit with an existing alternating current comprises an impedance switchable into a parallel arrangement with the alternator, the impedance being of sufficiently low value that the prime mover cannot drive the alternator to produce a current around the parallel impedance and a switch to disconnect the prime mover driven alternator from the circuit with an existing alternating current.

BRIEF DESCRIPTION OF THE DRAWINGS

An example illustrating the present invention will now be described with reference to the accompanying drawings in which.

DETAILED DESCRIPTION OF THE PREFERRED EMBODIMENT

Figure 1:
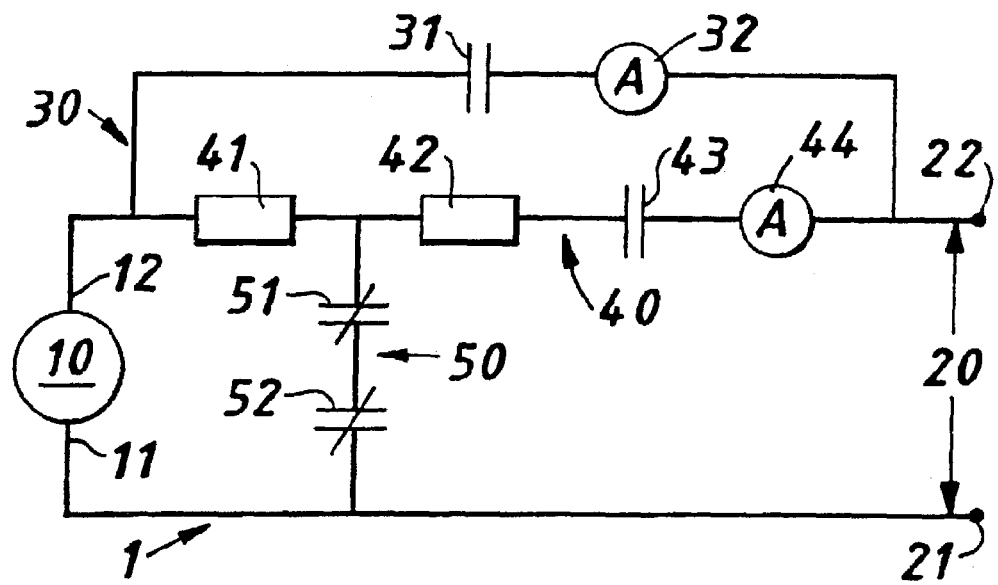
FIG. 1 shows a connector arrangement for connecting a prime mover driven alternator to a circuit with an existing alternating current.

The prime mover which drives the alternator 10 in the present example shown in FIG. 1 is a Stirling engine as is well known in the art, such as the one described in WO 94/04878 for example. However, any other suitable prime mover such as a gas engine, an internal combustion engine or a steam turbine for example would be suitable. Any suitable alternator may be used but in the present example a linear alternator has been found to work particularly well with the reciprocating Stirling engine. In the present example shown in FIG. 1 the main electricity supply 20 between neutral 21 and a live terminal 22 acts as the circuit with an existing alternating current. The alternator has two terminals 11, 12 one of which 11 is connected to neutral. The other terminal 12 of the alternator 10 is connectable to the live main supply 22 by two parallel paths 30, 40. The first electrical path 30 has a switch 31 and a meter 32 in series and the second electrical path 40 has a first impedance 41, which in the present example is 10 ohms, a second impedance 42, which in the present example is 27 ohms, a switch 43 and a meter 44 in series.

Between impedances 41 and 42 a line 50 connected to neutral 21 is provided. The line 50 has two switches 51, 52 in series.

Figure 2:
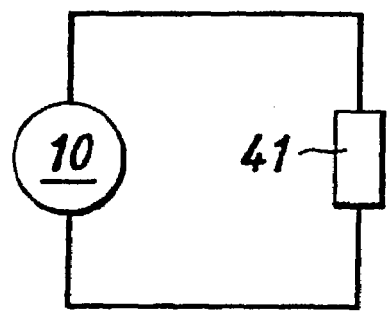
FIGS. 2 to 7 show the effective state of that circuit at various intervals.
Figure 3:
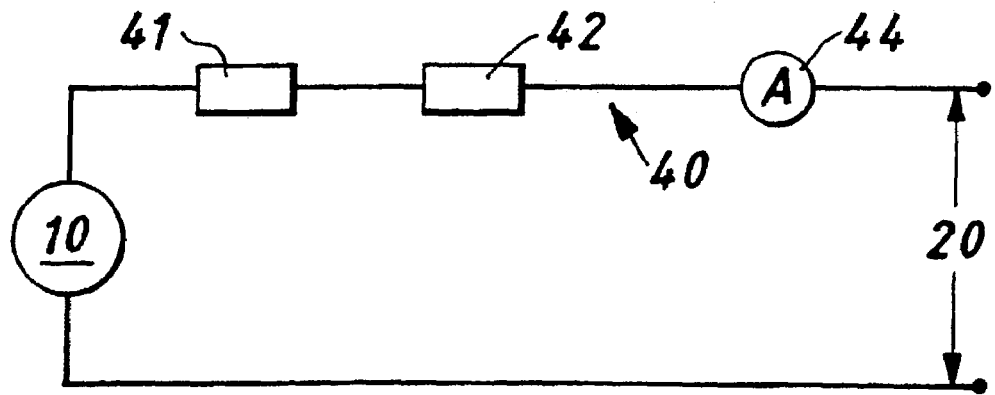

Before starting the Stirling engine and connecting the alternator to the main supply, switches 31 and 43 are opened and switches 51 and 52 are closed to produce the effective circuit shown in FIG. 2 with resistor 41 connected around the alternator 10. The impedance of resistor 41 is selected to be sufficiently low such that the prime mover driven alternator 10 cannot produce a current required to pass through the resistor 41 so that the engine is stalled and kept in a stationary condition. The engine (not shown), which in this case is a Stirling engine, is then brought into a condition ready for use by applying heat to one end of its piston chamber and cooling the other end. When the engine is sufficiently "warmed up" to achieve steady state operation and it is desired to connect the alternator 10 to the main electricity supply 20, switch 52 is opened and switch 43 is closed. Switches 52 and 43 are provided by a "break before make" switching arrangement as is well known in the art to ensure that switch 52 is open before switch 43 is closed. The connector arrangement is then effectively in the configuration shown in FIG. 3 with the alternator 10 connected to the main 20 through the two impedances 41 and 42 in series. The particular total value of the impedances 41 and 42 is selected dependent upon the particular prime mover and alternator combination that is used. In the present example, the sum of the series impedances has been selected at 37 ohms which dictates the current which passes through the coils of the alternator and which in turn dictates the force applied to the moving portion of the alternator within the coils which in this case is a piston. The force must be sufficient to start movement of the piston and yet must not be so excessive that it produces so much force that the piston damages the alternator or prime mover. As can be seen, the particular impedance value selected would be dependent upon the particular type of prime mover and alternator used.

The connector arrangement 1 of the present invention is particularly suitable for use with a Stirling engine as the prime mover of the alternator as the Stirling engine can be powered by an external heat source and then remain in a steady state ready to be brought into operation extremely quickly. Furthermore, starting the engine only requires a small amount of energy since the piston is relatively light and can be accelerated from rest very easily. The acceleration of the piston from rest is continued in the normal operation of the engine by linear simple harmonic motion.

Starting the prime mover driven alternator in this manner ensures that the alternator 10 produces electricity of a suitable power quality for the main electricity supply with the same frequency and in phase.

Figure 4:
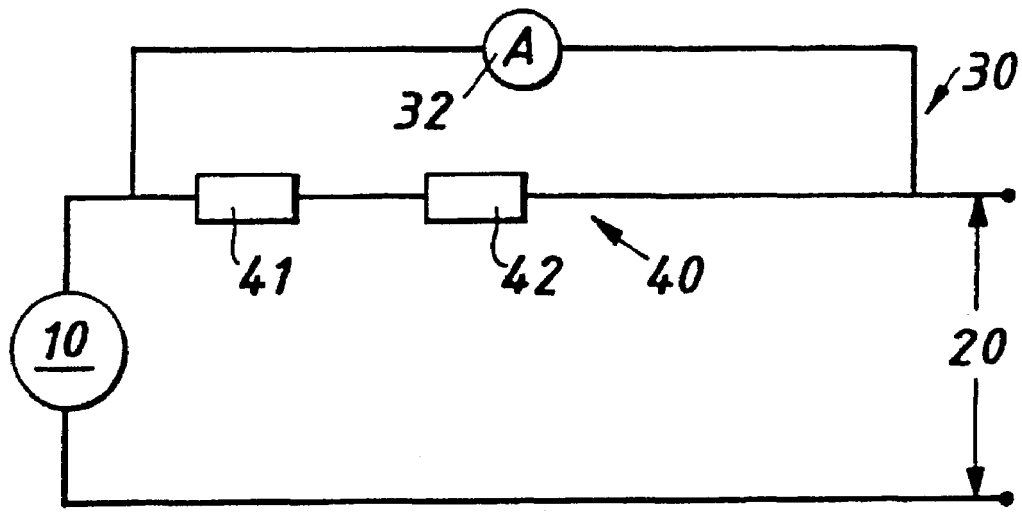
Figure 5:
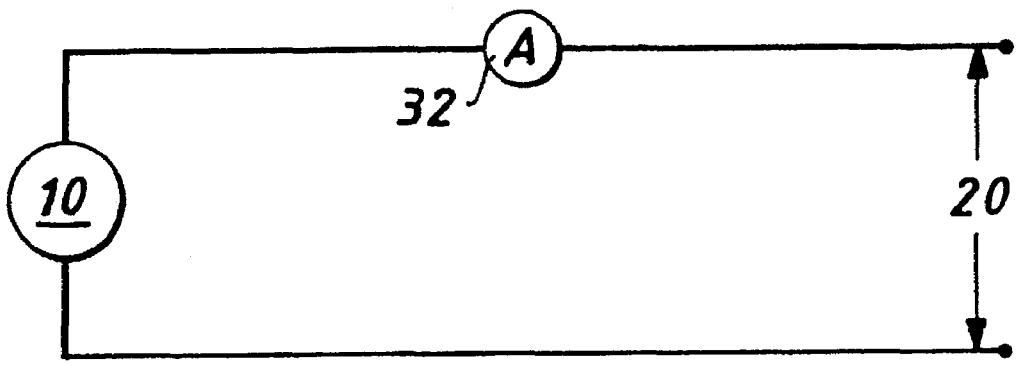

The connector arrangement 1 of the present invention is provided with a meter 44 which provides an indication of the current passing through line 40. After switch 43 is closed the current measured by meter 44 is checked to ensure that it is within expected parameters. This check provides an indication that the impedances 41, 42 and contacts of the switches 31, 43, 51, 52 are working satisfactorily. The current measured by meter 44 is read by a controller 101 which compares it with expected values to ensure that the connector arrangement 1 is functioning correctly. If the measured value is outside the desired values the control means performs an emergency shut down procedure as described later. However, under normal circumstances, the reading of meter 44 will be within expected parameters and so switch 31 is closed and switch 51 is opened to produce the effective circuit shown in FIG. 4. Switches 31 and 51 are provided in a "make before break" configuration as is well known in the art. After a suitable period of time has elapsed for the current through line 30 to settle, for example 100 ms, the current through meter 32 is checked to see whether it is within normal operating parameters. If it is not then the connector arrangement undergoes emergency shut down procedures as are described later. However, under normal circumstances the current will be within normal parameters and switch 43 is then opened to eliminate the impedance provided by impedances 41 and 42 such that the prime mover driven alternator is directly connected to the main as shown in FIG. 5. Since in the present example switches 43 and 52 are formed together in a "break before make" arrangement the opening of switch 43 also closes switch 52. However, no current passes through line 50 because switch 51 remain open. The prime mover driven alternator 10 continues to be directly connected to the main supply 20 as shown in FIG. 5 until it is desired to turn off the prime mover. During normal operation the current passing through meter 32 is monitored at regular intervals to ensure that the connector arrangement 1 is working satisfactorily and to ensure that the prime mover driven alternator is operating within its normal specification.

Figure 6:
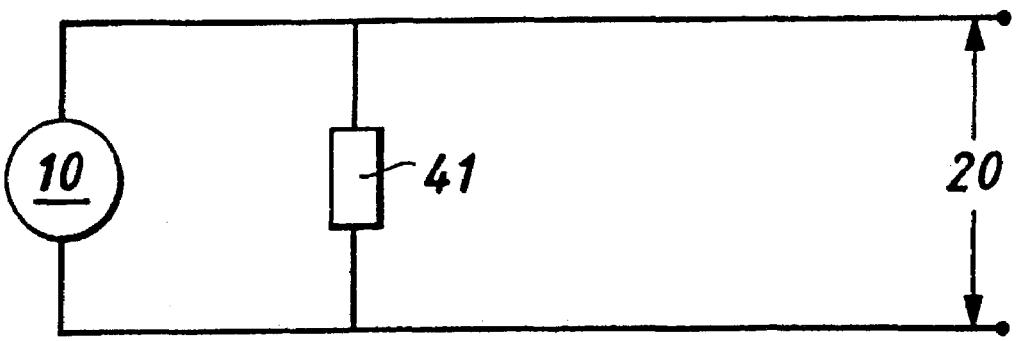
Figure 8:
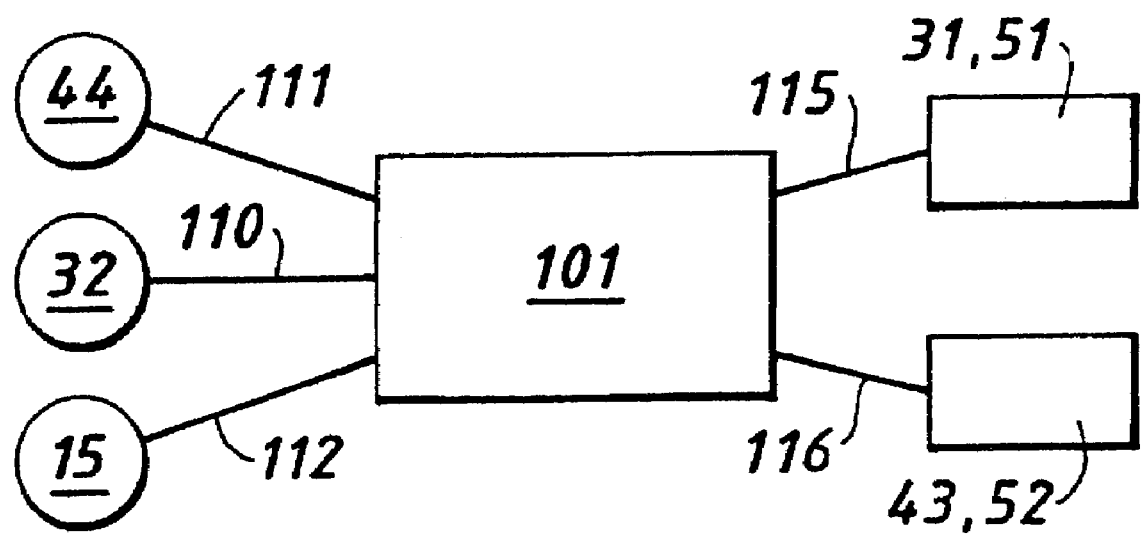
FIG. 8 shows a control system for controlling switches in the connector arrangement.

When it is desired to disconnect the prime mover driven alternator 10 from the main supply 20 the heater of the Stirling engine which is used in the present example is turned off and the remaining heat in the Stirling engine is used up. When the Stirling engine drops below a critical temperature it starts drawing power from the main 20 rather than supplying it as is well known in Stirling engine operation. A temperature detector 15 provided on the Stirling engine is connected to a controller 101 (see FIG. 8) and when this critical temperature is reached, which for the Stirling engine used in the present example is 300° C., switch 51 is closed to produce the effective circuit shown in FIG. 6 for a few milliseconds as the "make before break" switch arrangement of switches 31 and 52 changes state. In this arrangement the engine stalls because it cannot produce sufficient current to be driven through the impedance 41. The value of impedance 41 is selected for the particular type of prime mover driven alternator 10 used such that the prime mover driven alternator cannot produce sufficient current to be driven through the resistor 41 so that the engine stalls.

Figure 7:
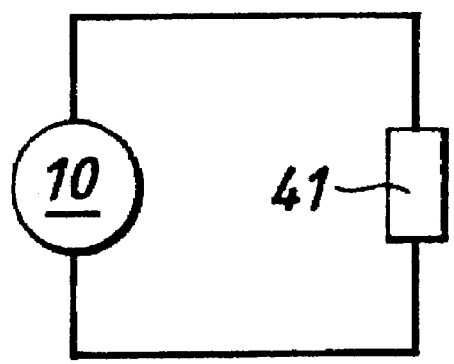

After a suitable period of time for the prime mover driven alternator to stall, in this example 1.5 ms, switch 31 of the "make before break" switch arrangement of switches 31 and 51 is opened to disconnect the prime mover driven alternator from the main 20 to produce the effective circuit shown in FIG. 7. Substantially less or no arcing is produced as the prime mover driven alternator is already stopped before it is disconnected from the main supply 20.

When the prime mover driven alternator is disconnected from the main 20 in an emergency situation, for example because the current detected at meters 32 or 44 is outside normal parameters, then switch 51 is closed and switch 31 is opened without waiting for the remaining heat in the Stirling engine to be used up. This should prevent the prime mover driven alternator from suffering any damage due to operation outside its normal conditions.

The arrangement of the control system for controlling switches 31, 51, 43, 52 in the manner described above is shown in FIG. 8.

The controller 101 which may be a microprocessor or a computer for example has data links 110, 111 to meters 32 and 44 respectively and a data link 112 to temperature detector 15 on the Stirling engine. The controller 101 also has actuating links 115, 116 to "make before break" switch arrangement 31, 51 and "break before make" switch arrangement 43, 52 respectively.

Figure 9:
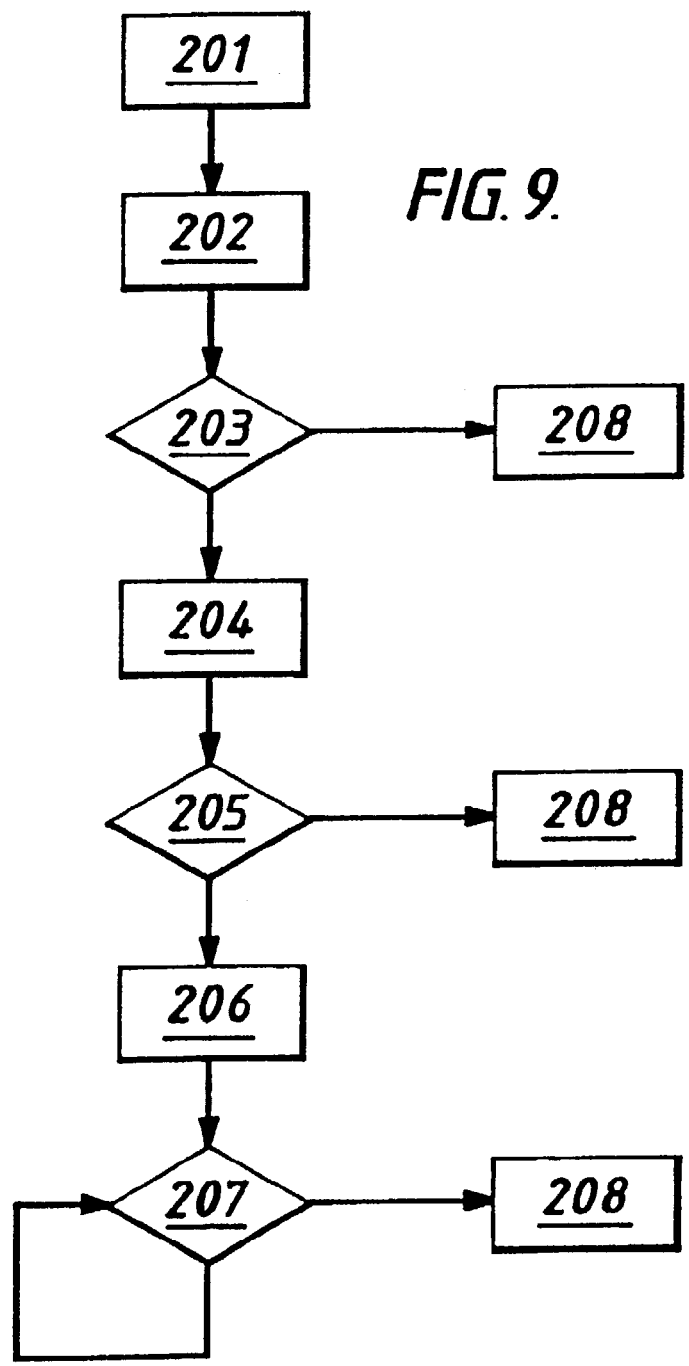
FIG. 9 shows the sequence of steps followed by the control system to connect a prime mover driven alternator to a circuit with an existing alternating current and FIG. 10 shows the sequence of steps followed by the control system to disconnect a prime mover driven alternator from a circuit with an existing alternating current.

The sequence of operations followed by the control system for connecting the prime mover driven alternator 10 to the main electricity supply 20 is shown in FIG. 9.

At step 201 the connector arrangement 1 is initially put into the condition in which:
SWITCH 31 is OPEN
SWITCH 43 is OPEN
SWITCH 51 is CLOSED
SWITCH 52 is CLOSED
At step 202
SWITCH 52 is OPENED and
SWITCH 43 is CLOSED
At step 203
A reading is taken from meter 44 and if it is outside expected conditions emergency shut down is activated at step 208. If the reading is inside expected conditions the control means proceeds to step 204.
At step 204
SWITCH 31 is CLOSED and
SWITCH 51 is OPENED
At step 205
A reading is taken from meter 32 and if it is outside expected conditions emergency shut down is activated at step 208. If the reading is within expected conditions the control means proceeds to step 206.
At step 206
SWITCH 43 if OPENED and
SWITCH 52 is CLOSED
At step 207
Meter 32 is monitored and if a reading is taken which is outside expected conditions emergency shut down is activated at step 208. Otherwise the system continues with this switch arrangement until disconnection is required as shown in FIG. 9.

Figure 10:
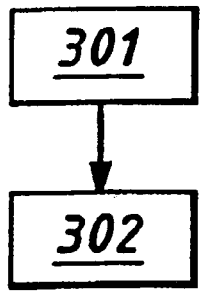

The sequence of operations followed by the control system for disconnecting the prime mover driven alternator 10 from the main electricity supply is shown in FIG. 10.
Initially
SWITCH 31 will be CLOSED
SWITCH 43 will be OPEN
SWITCH 51 will be OPEN and
SWITCH 52 will be CLOSED At step 301 the heater for the Stirling engine is turned off and the temperature of the Stirling engine is monitored on line 112 until it reaches a critical temperature at which the engine begins drawing or is about to draw power from the main. When this temperature is reached the control means proceeds to step 302.

At step 302 "make before break" switch arrangement 31, 51 is activated such that
SWITCH 51 is CLOSED and then
SWITCH 31 is OPENED
For emergency shut down the control system proceeds directly to step 302.

A Stirling engine driven alternator 10 and connector arrangement 1 can be transported with the connector arrangement 1 arranged with switches 31 and 43 open and switches 51 and 52 closed to produce the effective circuit shown in FIGS. 2 and 7. In this condition the piston of the Stirling engine is held substantially stationary so that no damage will be caused to the Stirling engine by movement or vibration during transportation.

The use of mechanical switches to perform the shutdown sequence rather than an external timing device enables shutdown to be performed even in the event of loss of the power supply. The connector arrangement 1 is able to provide both connection and disconnection from the main power supply with the same components thus lowering the component count by providing dual functionality.

The connector arrangement 1 provides both a reliable main supply connection and a safe instant disconnection in the event of loss of main electricity supply. The method relies on connection to a circuit with an existing alternating current such as the main.

As well as using the full circuit design, part of the circuit may be used for a particular connection or disconnection application. For example the disconnection circuit could be used for a stand alone generator and the connection circuit could be used for grid independent starting.

What is claimed is:

1. A method of disconnecting a prime mover driven alternator from a circuit which is carrying an existing alternating current comprising
    connecting an impedance in parallel with the prime mover driven alternator, whilst the alternating current exists within the circuit, the impedance having a sufficiently low impedance value to require a current in excess of that which the alternator is able to deliver to prevent the prime mover from driving the alternator and thus stalling the prime mover and
    disconnecting the alternator from the circuit with an existing alternating current.

2. The method according to claim 1, in which the prime mover is a Stirling engine and the alternator is a linear alternator.

3. The method according to claim 2, in which the Stirling engine has a heater and the heater is turned off and heat in the Stirling engine is used up before the impedance is connected in parallel with the alternator to stall the Stirling engine.

4. The method according to any of claim 1 in which the circuit which is carrying an existing alternating current is the main electricity supply.

5. An apparatus for disconnecting a prime mover driven alternator from a circuit which is carrying an existing alternating current comprising:
- an impedance switchable into a parallel arrangement with the alternator, the impedance being of sufficiently low value that the prime mover cannot drive the alternator to produce a current around the parallel impedance;
- a switch to disconnect the alternator from the circuit with an existing alternating current; and
- a make-before-break switch to connect the impedance into a parallel arrangement with the alternator before disconnecting the alternator from the circuit which is carrying an existing alternating current.

6. An apparatus for disconnecting a prime mover driven alternator from a circuit which is carrying an existing alternating current comprising:
- an impedance switchable into a parallel arrangement with the alternator, the impedance being of sufficiently low value that the prime mover cannot drive the alternator to produce a current around the parallel impedance and
- a switch to disconnect the alternator from the circuit with an existing alternating current,
- wherein the prime mover driving the alternator is a Stirling engine and
- wherein supply of heat to the Stirling engine is interrupted before the impedance is switched into a parallel arrangement with the alternator.

* * * * *